United States Patent [19]
Pakulak

[11] 3,724,917
[45] Apr. 3, 1973

[54] PILLOW BLOCKS AND FLANGE CARTRIDGES

[76] Inventor: Pete Pakulak, 290 9th Street, San Francisco, Calif. 94103

[22] Filed: Apr. 26, 1971

[21] Appl. No.: 137,149

[52] U.S. Cl. ..................................308/72, 308/194
[51] Int. Cl. ..........................F16c 23/00, F16c 43/06
[58] Field of Search..............................308/72, 194

[56] References Cited

FOREIGN PATENTS OR APPLICATIONS 862,009  3/1961  Great Britain..........................308/72

*Primary Examiner*—Charles J. Myhre
*Assistant Examiner*—Frank Susko
*Attorney*—Arlington C. White

[57] ABSTRACT

Self adjusting ball bearing support housings of two sections exemplified in pillow blocks and flange cartridges. Each of said sections comprises complementary inner spherical seats for the reception of the spherical outer race of a supported bearing, and an inner shoulder on one of said sections defining an annular space between the two sections to accomodate the self adjustment of the other section in relation to said one section and the self seating of the other section in relation to the outer race of a supported bearing.

4 Claims, 12 Drawing Figures

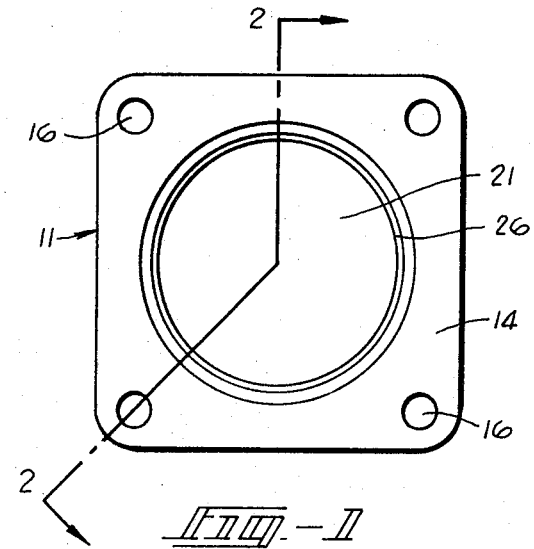
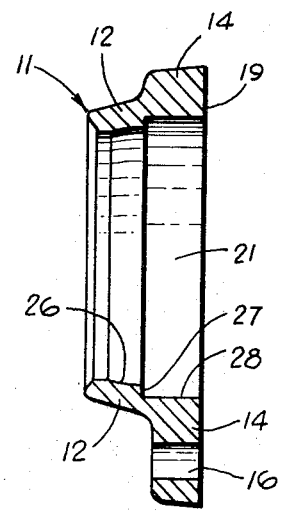
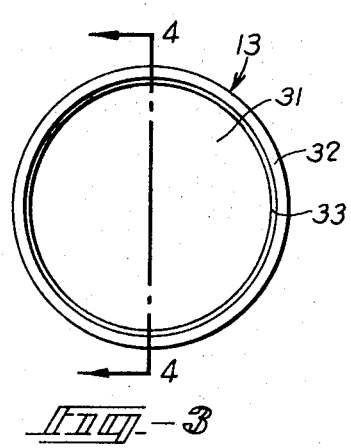
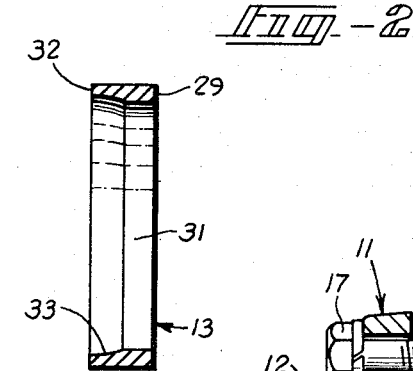
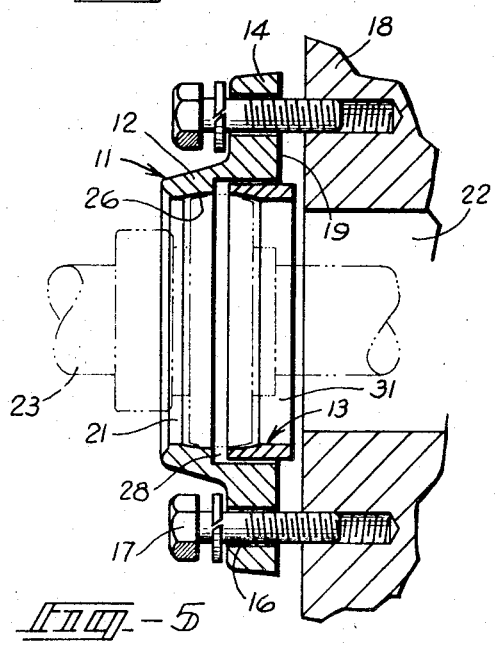
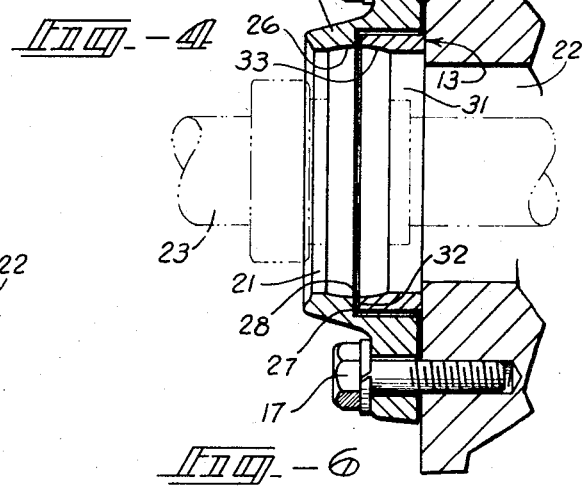
INVENTOR.
PETE PAKULAK
BY Arlington G. White
ATTORNEY

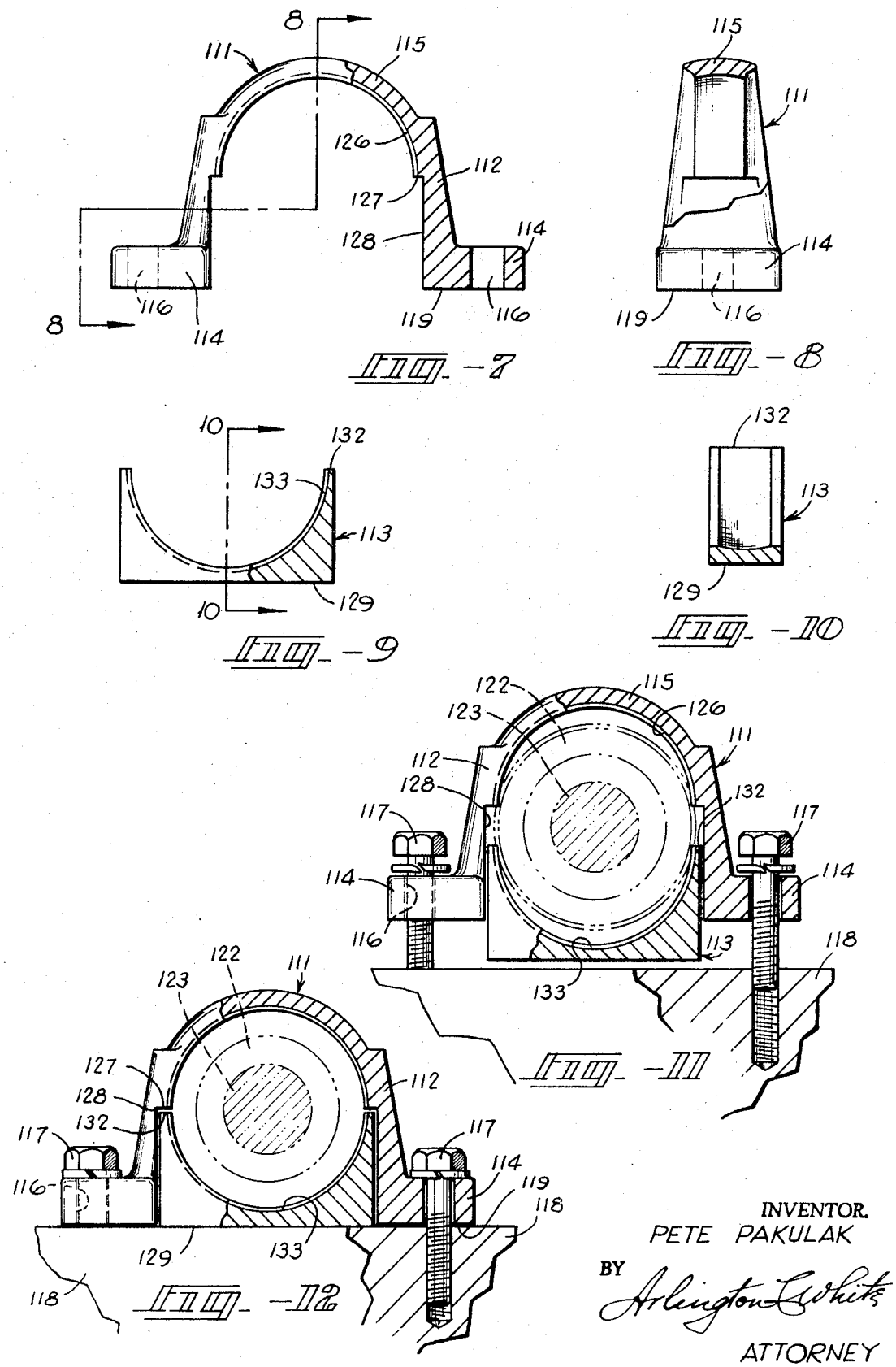

PILLOW BLOCKS AND FLANGE CARTRIDGES

Heretofore in the art of housing manufacture for ball bearings, it has been the general practice to cast one-piece pillow blocks and one-piece flange cartridges in different sizes to meet the requirements of industrial applications where not only normal load but excessive loads are encountered; such castings being mountable in any positions to accomodate variable placements of shafts and yokes or brackets. These prior one-piece castings have numerous disadvantages among which are the necessity of an eccentric machining tool for machining the foundry core of the casting; the necessity of an eccentric grinding tool to bring the core to the close tolerance required; the appreciable cost involved for inspection after machining and inspection after grinding in order to enable the fitting of the bearing into the housing which again requires a special tool; and the inability to replace a bearing in the field. Prior one piece castings to house bearings are illustrated and described in a number of catalogs and references, in this connection is made to Service Catalog No. 20 of the Fafnir Bearing Company of New Britain, Connecticut, First Edition, published by such Company in 1968 pp. 86–109. In this same catalog, p. 99, there are illustrations of a pillow block consisting of two heavy gauge, zinc plated steel stampings, with bearings as a part of the assembly and a self-locking collar and, as stated, such stampings are made with a precision bearing seat in which dimensions are held to close tolerances to provide an accurate bearing-to-housing fit and to assure proper alignment of the parts. However, such units are not self-adjusting in relation to the outer spherical race of a supported bearing, and the units are marketed only with the bearing seated therein. The present invention obviates all of the disadvantages of prior bearing houses and is capable of being machined and ground with relatively simple tools and the bearing can be inserted and removed by hand and therefore readily replaced in the field.

A primary object of the present invention is to provide improved pillow blocks and flange cartridges for removably housing hand installed roller bearings.

Another important object of my present invention is to provide improved pillow blocks and flange cartridges of the indicated nature which are additionally characterized by their ease in manufacture with a self adjusting feature in relation to the spherical contour of the outer races of conventional bearings.

A still further object of the present invention is to provide two section pillow blocks and two section flange cartridges of the aforementioned character which appreciably reduces the sizes of stock and storage space to meet normal bearing requirements.

Another object of my invention is to provide improved pillow blocks and flange cartridges which require but minimum handling in preparing the same for housing conventional bearings.

A still further object of the invention is to provide two section bearing housings of the indicated nature which are capable of being manufactured and assembled at an irreducible minimum of cost which is appreciably lower than present costs for manufacturing single castings.

Other objects of the invention, together with some of the advantageous features thereof, will appear from the following description of the best mode contemplated for the construction thereof and the manner of using the same, as exemplified both in two section pillow blocks and flange cartridges which are illustrated in the annexed drawings. It is to be understood that variations thereof within the scope of the invention are covered by the appended claims.

Referring to the drawings:

FIG. 1 is a top plan view of an embodiment of the invention, as exemplified in a flange cartridge.

FIG. 2 is a sectional view of the embodiment shown in FIG. 1, this view being taken on the line 2—2 of FIG. 1.

FIG. 3 is a top plan view of the embodiment of flange cartridge of my invention, as depicted in FIGS. 1 and 2.

FIG. 4 is a sectional elevational view thereof taken on the line 4—4 of FIG. 3.

FIG. 5 is a vertical cross-sectional view of a preferred embodiment of the invention, as exemplified in a pillow block, this view showing the bearing and shafting mounted therein and the supporting base with bolts unscrewed but ready for tightening to assemble the housing in operative position.

FIG. 6 is a cross-sectional elevational view of the pillow block illustrated in FIG. 5 but with the bolts turned down to into the supporting base, and the bearing and shaft in operative positions by virtue of the self-adjustment of the block relative to the bearing.

FIG. 7 is a front elevation view, partly in section, of one section of my invention as exemplified in a pillow block.

FIG. 8 is a view of the pillow block section shown in FIG. 7 and taken on the line 8—8 thereof.

FIG. 9 is a front elevational view partly in section, of the other section of my invention in a pillow block.

FIG. 10 is a view of the lower section of my improved pillow block shown in FIG. 9 taken on the line 10—10 thereof.

FIG. 11 is a front elevation view, partly in section of the two section pillow block embodying my invention, this view illustrating the block in readiness for installation on an underlying support.

FIG. 12 is a view similar to FIG. 11 but with the bolts tightened down and the pillow block in operative position.

In their preferred forms, the pillow blocks and flange cartridges of my invention preferably each comprises a pair of separate sections consisting of an outer section and an inner section; said outer section comprising an inner segmental seat of spherical contour for receiving a portion of the spherical outer race of a ball bearing, an inner annular shoulder extending outwardly from the terminus of said seat and defining an inner annular space for permitting self-adjustment of the pillow blocks and flange cartridges about a contained ball bearing upon mounting the same in operative positions on a supporting beam; said inner section comprising an inner segmental seat of spherical contour for receiving another portion of the spherical outer race of the ball bearing, a flat base on said inner section for removable seating on a flat portion of the supporting beam, and an inner flat rim on said inner section disposable in said annular space between said outer and inner sections and in registry with said inner shoulder of said outer section.

As particularly illustrated in FIGS. 1 to 6 inclusive of the annexed drawings, I provide in the flange cartridge exemplifications of my improved bearing housings, generally designated by the reference numeral 11, a pair of complementary sections comprising an outer section 12 and an inner section 13 which are both cast from a suitable casting material such as malleable or ductile iron in accordance with conventional methods and from patterns for differences in sizes of bearings. As shown, the outer section 12 is provided with an apertured flange extension 14 which may extend merely in opposite directions for two bolt fasteners, or may extend in the configuration of a rectangle and apertured as indicated by the reference numeral 16 at the four corners thereof for the passage of bolts 17 whereby the flange cartridge 11 may be secured to a supporting beam 18; such beam being disposed vertically, see FIGS. 5 and 6, or horizontally or at an inclination depending upon conditions of shaft mounting. The outer casting 12 is fashioned with a flat annular base 19 defining a relatively large central opening 21 for the passage of a ball bearing 22 with journaled shaft 23 mounted therein, as clearly shown in FIG. 5 and 6. It is to be understood that no special tool is required to place the bearing 22 within the assembly of outer and inner sections 12 and 13, respectively, as this placement is merely a slip fit of the bearing which may be done manually in either the case of mounting a new bearing initially or in the field to replace a worn bearing.

In accordance with the present invention, as embodied in a flange cartridge, I provide on the outer section 12 thereof an inner segmental seat 26 of spherical contour and also provide at the inner terminus of seat 26 an annular shoulder 27 which defines in relation to the inner section a relatively deep annular space 28 for permitting self-adjustment of the two sections relative to one another and in holding engagement with a ball bearing about the spherical outer race thereof. As shown, the inner section 13 is provided with a flat annular base 29 bounding a relatively large central opening 31 for alignment with the large central opening 21 of the outer section 12; the flat annular base 29 of the inner section 13 engaging, when the flange cartridge 11 is mounted, a portion of the supporting beam 18. The inner section 13 is cast with an inner annular rim 32 which is disposable in the annular space 28 in registry with the annular shoulder 27 of the outer section 12, and also is cast with an inner segmental seat 33 of spherical contour for receiving another portion of the spherical outer race of ball bearing 22.

It is to be noted that the flange cartridge 11 of the outer and inner sections 12 and 13, respectively, and encompassing the bearing 22 with its mounted shaft 23 presents, prior to the final securing of the housing to a supporting beam, the base 29 of the inner section 13 a short distance from the surface of the supporting beam, see FIG. 5 while the inner rim 32 of such inner section presents a clearance between it and shoulder 27 of the outer section 12. As the bolts 17 are tightened down, the base 29 of inner section 13 engages firmly with the beam 18 and is moved toward the base of the outer section so that the two sections self-adjust and take up the clearance or space 28 with the inner seats 26 and 33 of the two sections engaging portions of the outer spherical race of the ball bearing 22 to hold the same firmly in operative position. Also, upon this self-adjustment of the two sections, the inner rim 32 of the inner section 13 engages the annular inner shoulder 27 of outer section 12 of the flange cartridge 11 and the space between the base 19 of outer 12 and the supporting beam 18 is virtually reduced to zero. Should the bearing 22 become unduly worn in use and be required to be replaced, it is only necessary to loosen the bolt 17, manually slip out the bearing and shaft, replace the same with a new bearing and shaft section, and then tighten down the bolts 17 again into the supporting beam 18.

In FIGS. 7 to 12 inclusive of the annexed drawings I have illustrated the invention as embodied in a two section pillow block, designated generally by the reference numeral 11, which is cast either from malleable or ductile iron utilizing patterns of the sections for different sizes of bearings. In this embodiment, I provide an outer section 112 and an inner section 113, see FIGS. 7 and 9, respectively. The outer section 112 comprises opposed flanges 114 extending from and merging with an arched segment 115 and provided with suitable apertures 116 for passing bolts 117 whereby the pillow may be mounted upon a support beam 118, see FIGS. 11 and 12. The flanges 114 of pillow block section 112 are conveniently formed with a flat base 119 which seats on the supporting beam 118 when the bolts are fully tightened down; such flanges defining a relatively large central opening 121 for passing, in conjunction with the arched segment 115, a ball bearing 122 with its mounted shaft section 123, as shown in FIGS. 11 and 12.

In accordance with the present invention, I provide on outer section 112 of the pillow block 111 an inner segmental seat 126 as well as provide an inner annular shoulder 127 thereon extending from the terminus of such seat 126 which is made to a spherical contour for receiving the outer spherical race of ball bearing 122; such shoulder 127 defining a deep annular space 128 for allowing self-adjustment of the two sections 112 and 113 relative to one another as they are mounted on supporting beam 118. The inner section 113 of the pillow block is relatively small compared to the outer section 112 and comprises a flat base 129 removably seated on a flat portion of the supporting beam 118, and includes a flat annular inner rim 132 as well as an inner segmental seat 133 of spherical contour for receiving the outer spherical race of the ball bearing 122.

I have shown in FIG. 12 the assembled outer and inner sections 112 and 113, respectively of my improved pillow block 111 loosely mounted on the supporting beam 118 with the bolts 117 only partially turned down to their fullest extents. As illustrated particularly in FIG. 11, this partial mounting of the pillow block presents the clearance or annular space 128 between the two sections with the flat base 129 of inner section 113 appreciably below the base 119 of the flanges 114 but with a clearance between such flat base 129 of the inner section and the supporting beam 118, see FIG. 11. When the bolts 117 are turned down to their fullest extents to fasten the pillow block firmly to beam 118 in operative position see FIG. 12, the clearance between the flat base 119 of outer section 112 and the supporting beam 118 becomes virtually zero with the inner rim 132 of the inner section 113 engaging the inner annular shoulder 127 of the outer section 112, thus providing self-adjustment of the two sections by virtue of the tension and bending moments applied at the junctures of the base 119 and beam 118 during the tightening of the bolts 117. It is clear that to replace any worn bearing in the field, which is slip-fitted manually into place within the sections, it is only necessary to loosen the bolts 117, remove the worn bearing with shaft section, replace the same with a new bearing and shaft section, and then re-tighten the bolts 117 to their fullest extents; no tool being required to make the change.

From the foregoing description of the best modes contemplated for the construction and manner of using my improved pillow blocks and flange cartridges, it will be clear that machining costs for such bearing housings are materially reduced inasmuch as exact tolerances between the bearing outer race and the housings are not required due to the self-adjustment of the two sections. Additional reasons for the lower machining costs reside in the fact that a simple cutting tool shaped to the size of the spherical contour of the outer race of the bearing can be employed to make the finish cuts in the castings, as compared to the requirement of somewhat expensive machining tools and equipment for machining the inside surface of the casting in a one piece bearing housing, as heretofore exemplified in pillow blocks and flange cartridges, as well as costs of inspections after machining and after grinding which are eliminated insofar as my improved pillow blocks and flange cartridges are concerned. Moreover, initial casting costs are lower for my pillow blocks since the core in my two section pillow block is not needed. It also is to noted that the increased amount of space and storage expense involved for stocking of a multiplicity of one piece pillow blocks containing different sizes of bearings with mounted difference sizes of shafts is completely avoided or to a large extent avoided in the stocking of my improved pillow blocks and flange cartridges since the housings and bearings witn contained shaft sections can be stocked space-wise separately because the housings can receive several bearings of the same outside dimensions yet have different shaft sizes.

It is to be understood that the embodiments illustrated may be varied within the scope of the invention as such variations are intended to be covered by the appended claims.

I claim:

1. A pillow block capable of being detachably fastened to a support; said pillow block comprising a pair of self-adjusting sections consisting of an outer section and an inner section for housing a bearing in which a shaft may be journaled; said outer section having at least one aperture therein for the passage of a bolt whereby the pillow block can be removably secured to a support and comprising an inner segmental bearing seat of spherical contour on said outer section for receiving a spherical portion of the outer race of a bearing, and an inner annular shoulder thereon projecting outwardly from the terminus of said segmental bearing seat and defining an adjacent annular space, and said inner section comprising a flat base engageable with a flat portion of the support upon which the block is mounted; a complementary inner segmental bearing seat of spherical contour for receiving another spherical portion of the outer race of the bearing, and an inner annular rim projecting outwardly from the terminus of said complementary segmental bearing seat of said inner section and extendable into said annular space in alignment with said inner shoulder of said outer section upon engagement of said flat base of said inner section with the support on which the block is mounted and the turning down of said bolt to its fullest extent to secure the block in operative position on the support.

2. A pillow block as set forth in claim 1 wherein said bearing seats of said outer and inner sections conform in contour to the outer spherical race of a contained ball bearing.

3. A pillow block as set forth in claim 1, and a flat base on said outer section surrounding said flat base on said inner section; said flat base on said outer section being engageable with a flat portion of the support when the block is mounted in operative position thereon.

4. A flange cartridge capable of being detachably secured to a support and serving as a retainer for a bearing in which a shaft may be journaled; said flange cartridge comprising a pair of self-adjusting sections consisting of an outer section and an inner section, said outer section having at least one aperture therein for passing a bolt whereby the cartridge may be secured to a support and having a central opening in the top thereof and a wide opening in the bottom thereof for placement and retention of a bearing and comprising an inner segmental bearing seat of spherical contour for receiving one spherical portion of the outer race of a bearing, and an inner annular shoulder projecting outwardly from the terminus of said segmental bearing seat and defining an inner annular space adjacent to said shoulder, and said inner section having openings in the top and bottom thereof in registry with the central opening in the top of said outer section and being movably mounted in said wide opening in the bottom of said outer section comprising an inner complementary segmental bearing seat of spherical contour for receiving another portion of the outer race of the retained bearing, and an inner annular rim projecting outwardly from the terminus of said complementary segmental bearing seat and extendable into said annular space in alignment with said inner annular shoulder of said outer section upon engagement of said flat bottom of said inner section with the support on which the flange cartridge is mounted and the turning down of said bolt to its fullest extent to secure the cartridge in operative position on the support.

* * * * *